United States Patent [19]

Rosenberger et al.

[11] 4,300,956

[45] Nov. 17, 1981

[54] METHOD OF PREPARING A METAL SUBSTRATE FOR USE IN A CATALYTIC CONVERTER

[75] Inventors: Gregory J. Rosenberger, Malvern; Louis Peters, Philadelphia, both of Pa.

[73] Assignee: Matthey Bishop, Inc., Malvern, Pa.

[21] Appl. No.: 139,667

[22] Filed: Apr. 14, 1980

[51] Int. Cl.³ .................. C23C 11/00; B23K 20/00
[52] U.S. Cl. ............................. 148/6.3; 72/147; 252/477 R; 228/173 C; 228/193; 228/220; 228/263 F; 422/180
[58] Field of Search .............. 252/477 R; 72/147; 422/180; 428/906; 228/173 C, 193, 220, 231, 263 F; 148/6.3

[56] References Cited

U.S. PATENT DOCUMENTS

| | | | |
|---|---|---|---|
| 3,966,646 | 6/1976 | Noakes et al. | 252/477 R |
| 3,992,330 | 11/1976 | Noakes et al. | 252/477 R |
| 4,098,722 | 7/1978 | Cairns et al. | 252/477 R |
| 4,186,172 | 1/1980 | Scholz | 422/180 |

*Primary Examiner*—W. J. Shine
*Attorney, Agent, or Firm*—Cushman, Darby & Cushman

[57] ABSTRACT

Metallic bodies having discontinuously contacting sheet surfaces such as convolute-wound corrugated/non-corrugated metal sheet auto catalyst supports having metal-to-metal diffusion bonds formed at the contacting surfaces are provided. The diffusion bonds formed at the contacting surfaces are provided. The diffusion bonds are produced by heating the body in a non-oxidizing atmosphere, whereby metal from one surface diffuses into the metal from an adjacent surface. Some bonds may also be formed by welding. The bond-formation step may be performed in tandem with a subsequent step of oxidizing the sheet surfaces where they are not bonded, e.g. for making them into a more effectively-adhesive substrate for the catalyst they are to bear.

7 Claims, 2 Drawing Figures

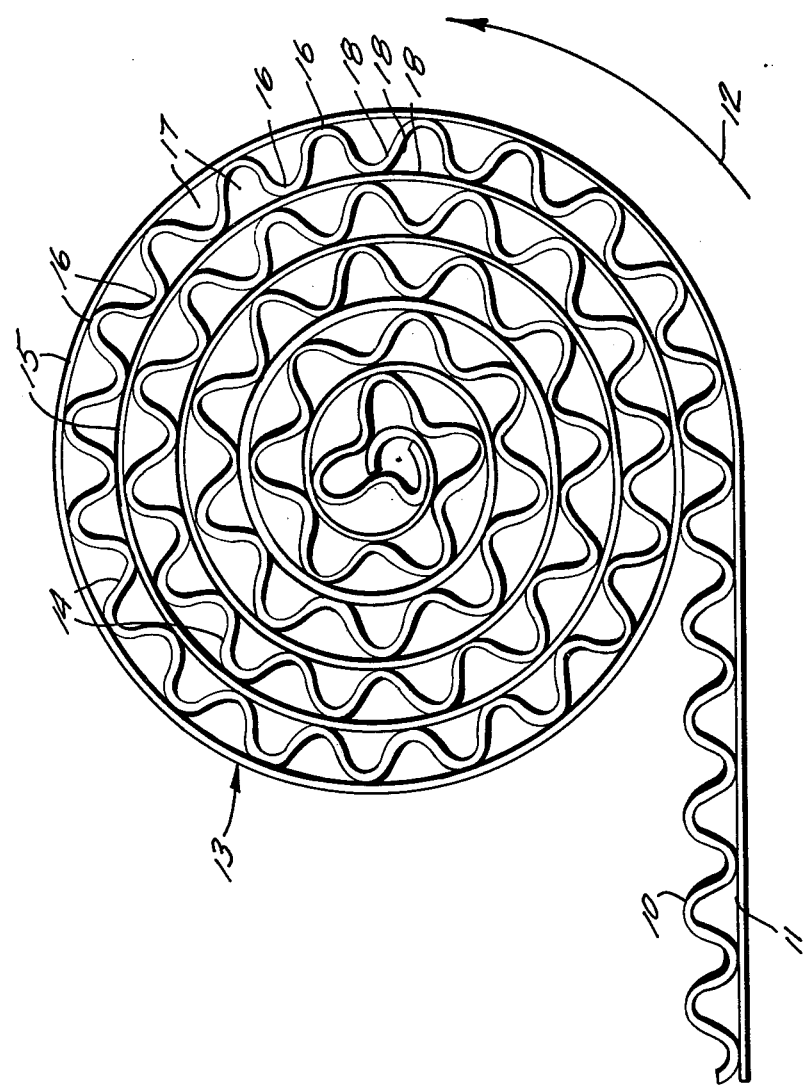

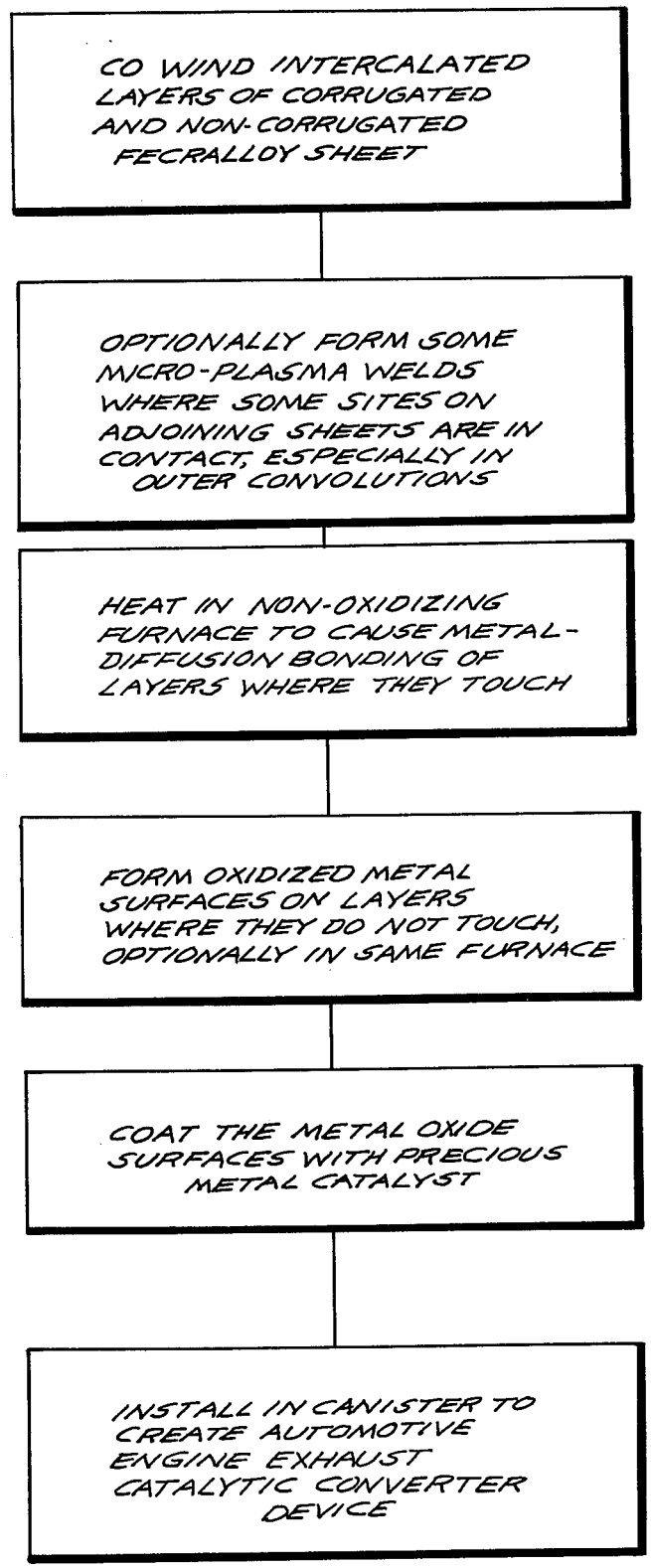

4,300,956

METHOD OF PREPARING A METAL SUBSTRATE FOR USE IN A CATALYTIC CONVERTER

BACKGROUND OF THE INVENTION

The invention relates to metal bodies such as auto catalyst supports having metal-to-metal diffusion and methods for forming same.

The automotive catalytic converter was introduced in the U.S. in about 1974. Since then, considerable advancements have been made. One of these improvements is the projected use of a metal-supported rather than ceramic-supported catalyst. The metal catalyst reduces both the volume and weight required to achieve the necessary catalytic efficiency. The metal supported catalyst, onto which the coating of alumina and precious metals is placed, is usually made by winding a suitable metal alloy with a flat and corrugated layer in a continuous concentric pattern.

A problem arises, however, in actual trial use where the layers telescope or extrude much like a collapsible cup. Once this occurs, the viability of the catalyst is lost.

It has become apparent that, in actual use, the metal supported catalyst will not remain intact simply under its own winding tension. Thus, it is necessary to try and arrest the tendency of the part to extrude. However, additional devices such as a simple retaining bar are not acceptable due to the added weight as well as pertubation of the gas flow.

As a possible solution to this dilemma, it has been proposed to fix the layers by a microplasma argon weld across the faces of the substrate. This welding process is an improvement, but it still is not a totally effective means to adequately prevent extrusion. Other problems associated with the welding process include the inherent difficulties associated with contacting the torch to the support and the optimization of suitable weld patterns to produce the desired effect. Therefore, there is a need in the art to develop improved techniques to prevent the extrusion and telescoping of metal auto catalyst supports.

As shown in FIG. 1, a corrugated metal sheet 10 has been laid upon a flat metal sheet 11 and the two sheets have been rolled together along the direction of arrow 12 to form cylinder 13. This cylinder 13 may be used as a metal substrate for an automobile catalyst. Notable features of this support include corrugated components 14, non-corrugated components 15, points e.g. lines 16 of contact between these corrugated and non-corrugated components and channels or open spaces 17.

The exposed surfaces 18 of corrugated and non-corrugated components are coated with a suitable e.g. precious metal catalyst to catalyze reactions in exhaust gas emissions flowing through channels 17.

One technique of applying the catalysts to the metal substrate is a wash-coating technique. According to this technique, since catalyst will not adhere sufficiently to the smooth metal surface of the support, a roughened alumina coat is applied to the substrate to promote adhesion of the catalyst. This roughened alumina coat may be obtained by first selecting as the composition for the components of the metal substrate an iron alloy containing aluminium. By heating this aluminium containing metal substrate in an oxygen containing atmosphere, $Al_2O_3$ is generated at the exposed surface of the substrate. Then, the substrate may be washed with a slurry of alumina-in-water followed by heating to drive off the water and fuse the alumina to the surface of the substrate. The thusly washed-coated metal substrate is then further coated with the active catalyst composition.

Unless structural integrity is provided to the metal catalyst support, the wash-coat and catalyst may be scraped off the support. More particularly, referring to FIG. 1, if no means is used to adhere the components of the metal substrate together, the corrugated component 14 may be axially displaced or pushed-out from the non-corrugated component 15 by the force of exhaust gases running through the supported catalyst. As mentioned previously, welding together of the various components has been proposed to rectify this problem, but there are disadvantages with that technique.

The invention is founded on the observation that some adhesion between the components of the metal substrate results from heating of the substrate in an oxygen atmosphere to form $Al_2O_3$ on the exposed surface of the substrate. More particularly, after such oxidation, when in order to destructively examine the product then under development a substrate was subsequently unwound, resistance to separating the layers was observed. The adhesion of the layers seemed to be a function of the winding tension, because adhesion was almost non-existent on the outer part of the substrate and the adhesion was observed to increase progressively towards the center. Accordingly, the oxidized metal surface components of the substrate tended to adhere to one another, much as a rusted bolt tends to fuse to the threads of the screw to which it has been joined. Furthermore, when contact areas were examined through a microscope, intermittent areas of bright fusion were observed.

SUMMARY OF THE INVENTION

It is a primary object of the invention to provide a method for improving the structural integrity of a metallic body such as an auto catalyst support by adhering together metal surfaces of the body by a metal-to-metal diffusion bonding process. This diffusion bonding process comprises subjecting the metallic body having contacted metallic surfaces to a sintering temperature under a substantially non-oxidizing atmosphere, whereby metal-to-metal diffusion bonding takes place at these contacted surfaces. This and other objects of the invention will become clear from an inspection of the detailed description of the invention and the appended claims.

A process for adhering contacted areas of the metal substrate together has been developed, whereby an actual metal-to-metal diffusion bond is formed. This process is distinguished from ordinary sintering technology. For example, rather than adhering together metal particles, metal sheets (e.g., having a thickness of approximately 50 micrometers) may be adhered together according to the metal-to-metal diffusion bonding technique.

It has further been observed that the presence of oxygen, e.g. in the form of air or water, has a deleterious effect on metal-to-metal diffusion bonding, perhaps due to the rapid formation of $Al_2O_3$ on the surface of the substrate. Therefore, the atmosphere in which metal-to-metal diffusion bonding takes place should be sufficiently free of air and/or water vapor that the surface of the substrate remains substantially non-oxidized during the sintering process. For the purposes of the specification and the claims which follow, such an atmosphere shall be connoted by the term "substantially non-oxidizing atmosphere".

Accordingly, metal-to-metal diffusion bonds may be produced in a reducing atmosphere, more particularly, a hydrogen atmosphere. However, it has been observed that when diffusion bonding takes place in a hydrogen atmosphere at pressures achievable in conventional ovens, the outer portions of the substrate become oxidized with little fusion, while the inner portions attain the desired extensive fusion while maintaining a bright anneal surface. Accordingly, it is preferred to produce diffusion bonds in air-tight furnace systems under a pressure within the lower end of the soft vacuum range, e.g. from about 0.5 to 5 micro-atmospheres. More particularly, it is preferred to produce diffusion bonds under vacuum at a pressure no greater than approximately 1 micro-atmosphere. By utilizing such a vacuum the dew point of the atmosphere in the oven may be reduced to no greater than $-120°$ F., as opposed to the $-20°$ to $-60°$ F. range achievable in conventional ovens. It will be understood that it is possible to flush the oven with an inert or reducing gas before vacuum is applied.

BRIEF DESCRIPTION OF THE DRAWING

FIG. 1 is an end elevation view illustrating the manner in which corrugated and non-corrugated components may be wound to form a catalyst support.

FIG. 2 is a flow chart of a preferred practice of the invention.

DETAILED DESCRIPTION OF THE INVENTION

The components 14, 15 of the metal substrate may be formed, for example, from an aluminum-containing ferritic steel of the type known as FECRALLOY (a trademark of the United Kingdom Atomic Energy Authority). Thus, the substrate may comprise an alloy of iron, chromium, aluminum and yttrium in which the portions lie in the range of up to 15% chromium, 0.5–12% aluminum and 0.1–3% yttrium, the balance being essentially iron.

The metal substrate is heated for a time and temperature sufficient to produce the desired metal-to-metal diffusion bonding effect. Thus, when an aluminum-containing ferritic steel of the type known as FECRALLOY is used to form the substrate, the substrate may be heated as a temperature of from about 1000° C. to about 1200° C. for a period extending from about 1 to about 2 hours.

Although FIG. 1 illustrates one possible geometrical arrangement for the components of the metal substrate, it will be understood that other arrangements are possible. Thus, the substrate may be in a shape adapted to conform to a variety of canister shapes used in automotive exhaust systems. For example, the metal support may be rectangular in cross-section, as opposed to the circular transverse cross-section shown in FIG. 1.

It will further be understood that the corrugations of the corrugated component may define a variety of shapes. Thus, the corrugations may form, in an alternative fashion, a pattern of inverted and non-inverted "V" or "U" shapes. According to another configuration, a pattern of trapezoidal channels may be displayed when the substrate is viewed in end view or transverse cross-section. However, for the purposes of producing the strongest sintering effect at 18, the sinusoidal pattern of corrugations, as depicted in FIG. 1, is preferred.

It is noted that it may be possible to replace the non-corrugated component 11 of FIG. 1 with a second corrugated component. However, this arrangement is not preferred, because of the tendency of cell nesting to occur, whereby the ridges of one corrugated component may become nested in the ridges of another component.

It will further be understood that the corrugated and non-corrugated components of metal substrate may be formed from a single metal sheet, as described in the Noakes et al. U.S. Pat. No. 3,966,646, the disclosure of which is incorporated herein by reference.

According to the present invention, it is possible to conduct metal-to-metal diffusion bonding and the desired subsequent oxidation of exposed aluminum to $Al_2O_3$ in the same oven. Such a process provides sintering and oxidation in not much longer time than merely practicing the procedure necessary to oxidize the surface of the metal substrate prior to the application of the wash-coat.

Accordingly, the non-bonded metal substrate can first be loaded into a vacuum oven. Then a substantially non-oxidizing atmosphere can be achieved by reducing the pressure of the oven to about 0.5–5 micro-atmospheres. Next, the substrate can be heated for a time and temperature sufficient to achieve the desired degree of metal-to-metal diffusion bonding. After this bonding is achieved, the oven can be backfed with argon to reduce the temperature to about 900° C. Then a small, controlled amount of oxygen sufficient to develop the $Al_2O_3$ surface can be bled into the oven, e.g. to achieve a partial pressure of oxygen ranging from about 1–5%. Finally, the substrate can be oxidized at about 1200° C. for about 1 hour.

It is noted that vacuum ovens tend to have oxygen-sensitive filaments such as graphite. Therefore, if oxidation is to be conducted following bond formation it may be desirable to replace these oxygen sensitive filaments with a more suitable material such as Kanthol (C. O. Jelliff Mfg. Corp.) or even passivated FECRALLOY.

It has been observed that a small weight-loss may occur to the metal substrate as a result of conducting the metal-to-metal diffusion process to provide bonding. This weight-loss has not yet been fully explained, but can be attributed in part to residual oils volatilizing from the substrate. There has been no indication that the yttrium or aluminum content of the alloy is reduced by conducting the process of the invention. Nonetheless, this weight-phenomenon provides incentive to avoid over-bonding of the metal substrate.

A metal-to-metal substrate diffusion bonding process may improve the wash-coat adhesion for two reasons. First, sintering provides a cleaner metal substrate surface, because impurities such as residual oils are "baked out" under the high temperature/vacuum conditions. Second, the numerous metal-to-metal bonds produced by sintering greatly reduce the back and forth motion of the metal upon temperature cycling. Such motion to the extent it occurs in all likelihood helps work the wash-coat loose. Thus, reduction of this motion improves adhesion.

A metal-to-metal diffusion bonding process also provides a substrate which has an increased resistance to cell nesting. It has been observed that nesting of the non-corrugated component in the corrugations of the corrugated component may occur when the catalyst substrate is subjected to the stresses associated with the treatment of exhaust fumes. This nesting may be caused by high temperature spikes combining with the radial component of the hot gas velocity to push out the non-corrugated component. The numerous metal-to-metal bonds produced by a metal-to-metal diffusion bonding process help to prevent this nesting by reinforcing the position of the non-corrugated component.

It is noted that a metal-to-metal diffusion bonding process may be used to supplement the adhesion produced between the components of the metal substrate by welding. Accordingly, it is for some practices possible to reduce the complexity and density of weld patterns associated with the welding adhesion process by subjecting a sparsely pre-welded substrate to diffusion bonding treatment according to the present invention, subsequent to conducting the micro-plasma welding. For example, a substrate can be wound with welding occurring at the outermost portions of the winding. Adhesion of the innermost components of the winding can subsequently be produced by a conduct of the metal-to-metal diffusion bonding process of the present invention.

EXAMPLE 1

A metal substrate was fabricated from FECRAL-LOY (United Kingdom Atomic Energy Authority) and was heated for 1 hour at 1200° C. under hydrogen at a dew point of −20° F. The outer 1" of the piece width was oxidized with little fusion, while the inner 1" had a bright anneal surface with extensive fusion.

EXAMPLE 2

Four metal substrates fabricated according to Example 1 were heated at 1000° C. for 1 hour at approximately 1 micron ($7 \times 10^{-4}$ atm.) with a −120° F. dew point. The appearance of the parts was difficult to distinguish from untreated metal substrates. Good metal-to-metal bonding was observed, but this bonding was somewhat incomplete.

EXAMPLE 3

Six metal substrates fabricated according to Example 1 were heated at 1200° C. for 1 hour at 0.8 μatm. As with the diffusion bonded pieces of Example 2, these pieces had a bright annealed surface. However the metal-to-metal bonding achieved was superior to that observed in Example 2.

While certain representative embodiments and details have been shown for the puspose of illustrating the invention, it will be apparent to those skilled in the art that various changes and modifications may be made therein without departing from the spirit or scope of the invention. Thus, although metallic auto catalyst supports have been exemplified herein, it will be understood that the subject matter of the present invention also pertains to the manufacture of other metallic bodies such as electrical resistance elements having the capacity to heat fluids flowing through the channels thereof. Still other metallic bodies include screens and filters.

It will further be understood that the invention may comprise, consist essentially of or consist of the steps or materials recited herein.

What is claimed is:

1. A method of preparing a metal substrate for use in a catalytic converter which comprises assembling together alternating layers of corrugated and non-corrugated sheets of metal alloy including aluminum as an alloy component so as to form an assembly wherein the layers have alternating areas of contact and non-contact; and heating the assembly in an oven under a hydrogen atmosphere at a pressure of from about 0.5 to 5 micro-atmospheres and a temperature in the range of about 1000° C. to about 1200° C. until the layers are bonded together by metal-to-metal diffusion bonding at the points where the flat and corrugated sheets are in contact.

2. The process of claim 1 wherein the assembly, after the diffusion bonding, is heated in an oxygen atmosphere to oxidize the non-contacting surfaces of the assembly and form aluminum oxide thereon.

3. The process of claim 2 wherein the heating in the hydrogen atmosphere is carried out under vacuum at a pressure no greater than about 1 micro-atmosphere.

4. The process of claim 3 wherein the dew point in the oven is no greater than −120° F.

5. The process of claim 1 wherein, after the diffusion bonding, the hydrogen is flushed out of the oven and the assembly is heated in an oxygen atmosphere to form aluminum oxide on the non-contacting surfaces of the assembly.

6. The process of claim 1 wherein the metal alloy comprises an alloy of iron, chromium, aluminum and yttrium in which the proportions lie in the range of up to 15% chromium, 0.5–12% aluminum and 0.1–3% yttrium, the balance being essentially iron.

7. The process of claim 1 wherein the sheets have a thickness of about 50 micrometers and the assembly is formed by rolling together alternating layers of corrugated and non-corrugated sheets of the metal alloys to form a cylindrical body.

* * * * *